US012677319B2

(12) United States Patent
Wang et al.

(10) Patent No.: US 12,677,319 B2
(45) Date of Patent: Jul. 7, 2026

(54) METHOD AND APPARATUS FOR MEASUREMENT WEIGHT FACTORS IN A RADIO SYSTEM

(71) Applicant: MediaTek Singapore Pte. Ltd., Singapore (SG)

(72) Inventors: Miao Wang, Beijing (CN); Tsang-Wei Yu, Tsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 297 days.

(21) Appl. No.: 18/299,715

(22) Filed: Apr. 13, 2023

(65) Prior Publication Data

US 2023/0337284 A1 Oct. 19, 2023

Related U.S. Application Data

(63) Continuation of application No. PCT/CN2022/087700, filed on Apr. 19, 2022.

(51) Int. Cl.
*H04W 74/0816* (2024.01)

(52) U.S. Cl.
CPC .............................. *H04W 74/0816* (2013.01)

(58) Field of Classification Search
CPC ............. H04W 24/10; H04W 36/0088; H04W 36/0094; H04W 74/0816
See application file for complete search history.

(56) References Cited

U.S. PATENT DOCUMENTS

| 2011/0281615 A1* | 11/2011 | Yamada | ................. H04L 1/1812 |
| | | | 455/524 |
| 2012/0294184 A1* | 11/2012 | Jung | .................. H04W 36/0085 |
| | | | 370/252 |
| 2016/0344485 A1* | 11/2016 | Yao | ......................... H04W 24/10 |

(Continued)

FOREIGN PATENT DOCUMENTS

WO    WO 2021/159350 A1    2/2020

OTHER PUBLICATIONS

Taiwan Intellectual Property Office Action 112114311, dated Feb. 1, 2024 (11 pages).

*Primary Examiner* — Kashif Siddiqui
(74) *Attorney, Agent, or Firm* — Helen Mao; Imperium Patent Works

(57) ABSTRACT

Apparatus and methods are provided for configuring and applying measurement weight factor for inter-frequency measurements. In one novel aspect, the UE applies measurement weight factors for inter-frequency measurements within configured measurement gap occasions. In one embodiment, the UE receives one or more measurement configurations, which configure a plurality of measurement objects (MOs) to be measured in one or more measurement gaps, obtains a measurement weight factor for each MO, wherein a set of measurement weight factors is included in the one or more measurement configurations; and performs inter-frequency measurements within configured measurement gaps applying corresponding measurement weight factor for each MO. In one embodiment, the set of measurement weight factors are configured for each frequency layer or for each MO. In one embodiment, each measurement weight factor for the same MO is determined based on one or more weight conditions.

20 Claims, 8 Drawing Sheets

(56) References Cited

U.S. PATENT DOCUMENTS

| | | | |
|---|---|---|---|
| 2017/0048734 A1* | 2/2017 | Kusashima | H04W 16/32 |
| 2021/0306893 A1* | 9/2021 | Zhang | H04W 24/08 |
| 2022/0046450 A1* | 2/2022 | Wang | H04W 36/00698 |
| 2023/0345286 A1* | 10/2023 | Zhang | H04W 24/10 |

* cited by examiner

| WITH WEIGHT FACTORS {1,1,5,1,1} 430 | | | | | | | | | | | |
|---|---|---|---|---|---|---|---|---|---|---|---|
| GAP OCCASION | 1 | 2 | 3 | 4 | 5 | 6 | 7 | 8 | 9 | 10 | 11 | 12 |
| # OF OBSERVED MO WITH WEIGHT | 8 | 7 | 7 | 7 | 8 | 7 | 7 | 7 | 8 | 7 | 7 | 7 |
| MEASURED OPP. FOR {MO_1,2,4,5} | 1/8 | 1/7 | 1/7 | 1/7 | 1/8 | 1/7 | 1/7 | 1/7 | 1/8 | 1/7 | 1/7 | 1/7 |
| MEASURED OPP. FOR {MO_3} | 5/8 | 5/7 | 5/7 | 5/7 | 5/8 | 5/7 | 5/7 | 5/7 | 5/8 | 5/7 | 5/7 | 5/7 |

| WITH WEIGHT FACTORS {1,1,5,1,1} 440 | | | | | | | | | | | |
|---|---|---|---|---|---|---|---|---|---|---|---|
| GAP OCCASION | 1 | 2 | 3 | 4 | 5 | 6 | 7 | 8 | 9 | 10 | 11 | 12 |
| # OF OBSERVED MO WITH WEIGHT | 7 | 7 | 7 | 7 | 7 | 7 | 7 | 7 | 7 | 7 | 7 | 7 |
| MEASURED OPP. FOR {MO_1,4,5} | 1/7 | 1/7 | 1/7 | 1/7 | 1/7 | 1/7 | 1/7 | 1/7 | 1/7 | 1/7 | 1/7 | 1/7 |
| MEASURED OPP. FOR {MO_2,3} | 5/7 | 5/7 | 5/7 | 5/7 | 5/7 | 5/7 | 5/7 | 5/7 | 5/7 | 5/7 | 5/7 | 5/7 |

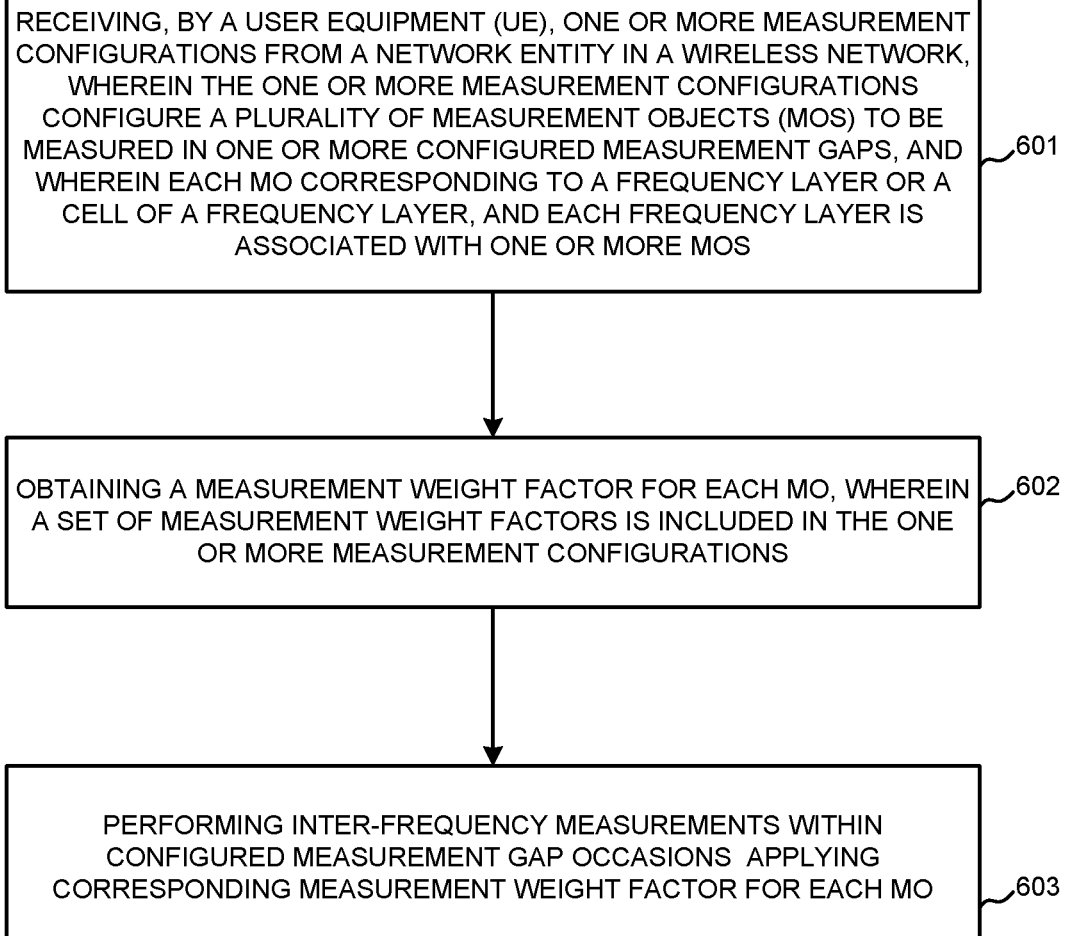

RECEIVING, BY A USER EQUIPMENT (UE), ONE OR MORE MEASUREMENT CONFIGURATIONS FROM A NETWORK ENTITY IN A WIRELESS NETWORK, WHEREIN THE ONE OR MORE MEASUREMENT CONFIGURATIONS CONFIGURE A PLURALITY OF MEASUREMENT OBJECTS (MOS) TO BE MEASURED IN ONE OR MORE CONFIGURED MEASUREMENT GAPS, AND WHEREIN EACH MO CORRESPONDING TO A FREQUENCY LAYER OR A CELL OF A FREQUENCY LAYER, AND EACH FREQUENCY LAYER IS ASSOCIATED WITH ONE OR MORE MOS   601

OBTAINING A MEASUREMENT WEIGHT FACTOR FOR EACH MO, WHEREIN A SET OF MEASUREMENT WEIGHT FACTORS IS INCLUDED IN THE ONE OR MORE MEASUREMENT CONFIGURATIONS   602

PERFORMING INTER-FREQUENCY MEASUREMENTS WITHIN CONFIGURED MEASUREMENT GAP OCCASIONS APPLYING CORRESPONDING MEASUREMENT WEIGHT FACTOR FOR EACH MO   603

FIG. 6

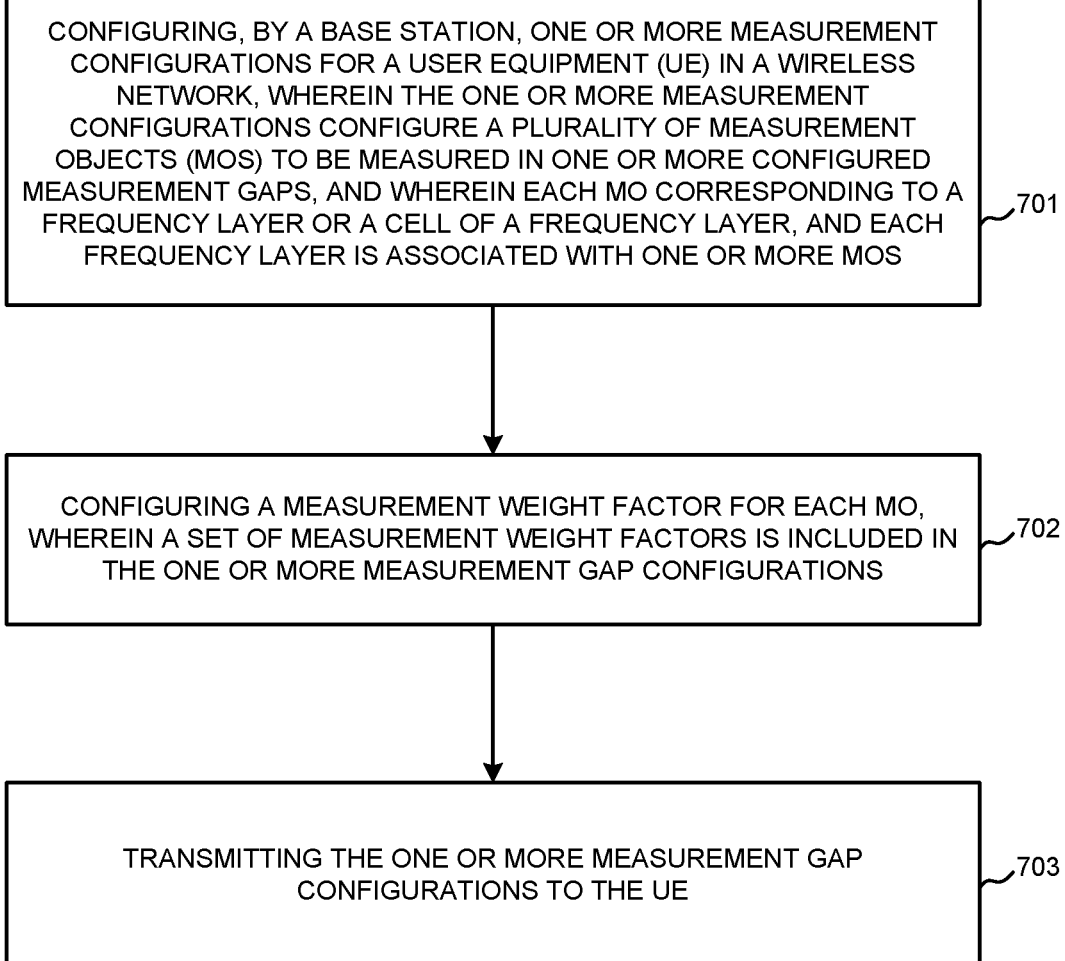

CONFIGURING, BY A BASE STATION, ONE OR MORE MEASUREMENT CONFIGURATIONS FOR A USER EQUIPMENT (UE) IN A WIRELESS NETWORK, WHEREIN THE ONE OR MORE MEASUREMENT CONFIGURATIONS CONFIGURE A PLURALITY OF MEASUREMENT OBJECTS (MOS) TO BE MEASURED IN ONE OR MORE CONFIGURED MEASUREMENT GAPS, AND WHEREIN EACH MO CORRESPONDING TO A FREQUENCY LAYER OR A CELL OF A FREQUENCY LAYER, AND EACH FREQUENCY LAYER IS ASSOCIATED WITH ONE OR MORE MOS

701

CONFIGURING A MEASUREMENT WEIGHT FACTOR FOR EACH MO, WHEREIN A SET OF MEASUREMENT WEIGHT FACTORS IS INCLUDED IN THE ONE OR MORE MEASUREMENT GAP CONFIGURATIONS

702

TRANSMITTING THE ONE OR MORE MEASUREMENT GAP CONFIGURATIONS TO THE UE

METHOD AND APPARATUS FOR MEASUREMENT WEIGHT FACTORS IN A RADIO SYSTEM

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2022/087700, titled "Methods and apparatus of measurement in a radio system," with an international filing date of Apr. 19, 2022. This application claims priority under 35 U.S.C. § 119 from Chinese Application Number 202310280604.5 titled "METHOD AND APPARATUS FOR MEASUREMENT WEIGHT FACTORS IN A RADIO SYSTEM," filed on Mar. 21, 2023. The disclosure of each of the foregoing documents is incorporated herein by reference.

TECHNICAL FIELD

The disclosed embodiments relate generally to wireless communication, and, more particularly, to measurement weight factors.

BACKGROUND

Measurement is a key function to support mobility and work effectively in a wireless communication system. At present, there are many kinds of measurements, such as layer three (L3) measurement on intra-frequency and inter-frequency in the same radio access technology (RAT), layer one (L1) measurement on intra-frequency and inter-frequency in the same RAT, L3 inter-frequency measurement in other RATs, measurement on non-terrestrial networks (NTN) frequency, measurement for positioning, received signal strength indicator (RSSI)/CO (channel occupation) measurement. With the rapid development of mobile communication system, UE is required to measure more and more frequencies for more and more use cases. Due to the limit of UE implementation, the UE usually performs measurement on inter-frequency in gap. Even the measurement on intra-frequency has to be performed in gap in some cases. With the demands of measurement on more frequencies, measurement delay on each frequency will get longer and longer or more independent gaps are required resulting in more interruptions on serving cell(s).

Considering the purpose of each measurement, some need UE to measure more timely, such as L1 measurement for beam management. Some may not need UE to measure quite often, such as measurement just for network optimization. In the new radio (NR) network, intra-frequency may also be measured within gap. A MeasGapSharingScheme is specified to split measurement opportunity between intra-frequency and inter-frequency in a gap occasion. However, all the inter-frequency measurements are treated equally. When there are multiple inter-frequencies to measure, the measurement delay would be quite long especially for FR2 (frequency range 2) due to beam sweeping. The delay is not acceptable for L1 measurement.

Improvements and enhancements are required to improve measurement efficiency and speed up measurement in some frequency layers.

SUMMARY

Apparatus and methods are provided for configuring and applying measurement weight factor for inter-frequency measurements. In one novel aspect, the UE applies measurement weight factors for inter-frequency measurements within configured measurement gap occasions. In one embodiment, the UE receives one or more measurement configurations, which configure a plurality of measurement objects (MOs) to be measured in one or more measurement gap occasions, obtains a measurement weight factor for each MO, wherein a set of measurement weight factors is included in the one or more measurement configurations; and performs inter-frequency measurements within configured measurement gaps applying corresponding measurement weight factor for each MO. In one embodiment, the set of measurement weight factors are configured for each frequency layer or for each MO. In one embodiment, each measurement weight factor for the same MO is determined based on one or more weight conditions. In another embodiment, the UE obtains measurement opportunity for each frequency layer based on the set of measurement weight factors. In yet another embodiment, the scaling factor (SF) for a frequency layer is obtained based on corresponding measurement opportunity for the frequency layer in each gap occasion.

In one embodiment, the base station configures one or more measurement configurations for a user equipment (UE) in a wireless network, wherein the one or more measurement configurations configure a plurality of measurement objects (MOs) to be measured in one or more configured measurement gaps, and wherein each MO corresponding to a frequency layer and each frequency layer is associated with one or more MOs; configures a measurement weight factor for each MO, wherein a set of measurement weight factors is included in the one or more measurement configurations, and transmits the one or more measurement configurations to the UE.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 illustrates an exemplary flow chart for a UE to apply the measurement weight factors in accordance with embodiments of the current invention.

FIG. 7 illustrates an exemplary flow chart for a base station to configure the measurement weight factors in accordance with embodiments of the current invention.

DETAILED DESCRIPTION

Reference will now be made in detail to some embodiments of the invention, examples of which are illustrated in the accompanying drawings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (Collectively referred to as "elements"). These elements may be implemented using electronic hardware, computer software, or any combination thereof. Whether such elements are implemented as hardware or software depends upon the particular application and design constraints imposed on the overall system.

Figure 1:
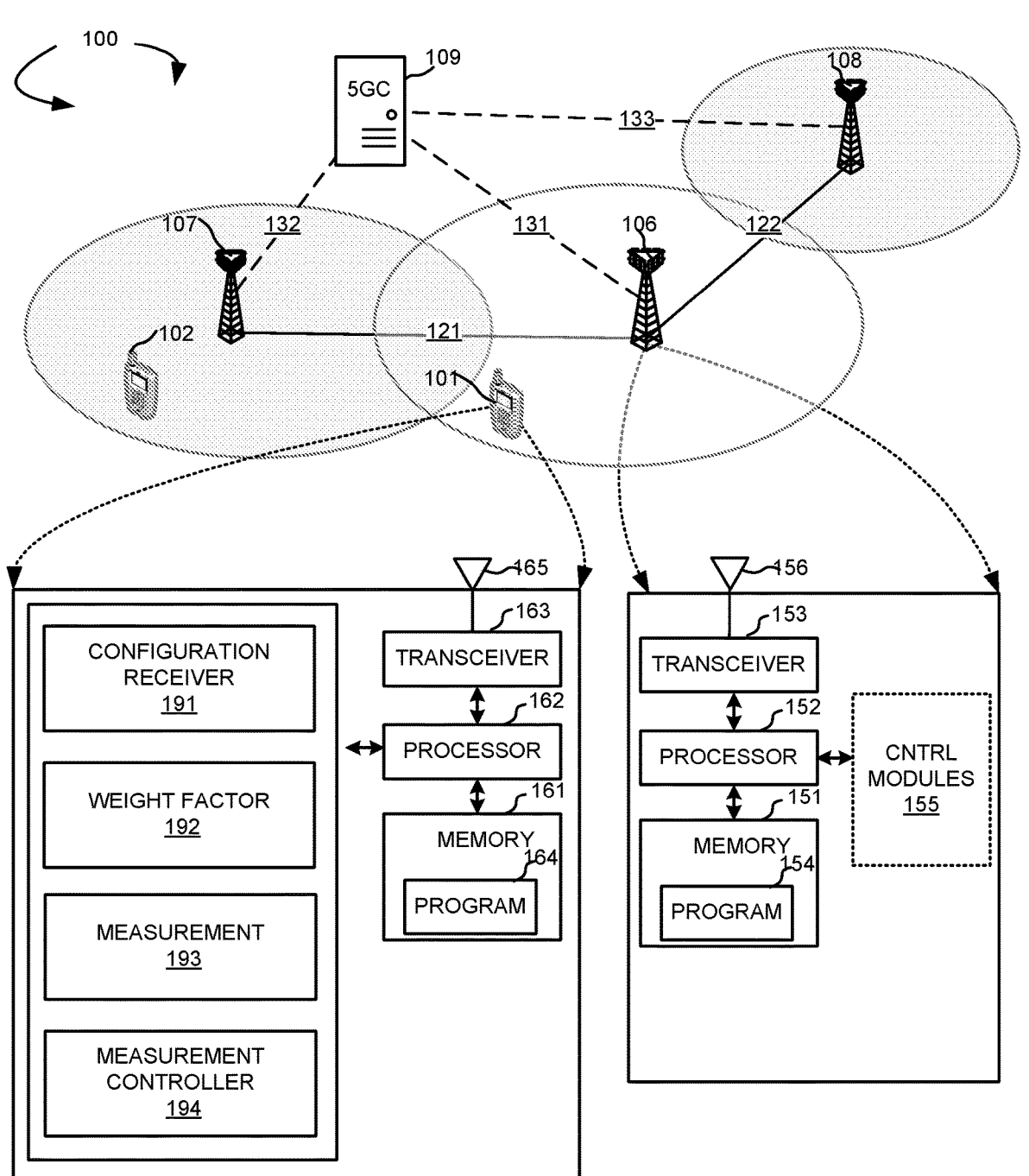
FIG. 1 is a schematic system diagram illustrating an exemplary wireless network that supports measurement weight factors in accordance with embodiments of the current invention.

FIG. 1 is a schematic system diagram illustrating an exemplary wireless network that supports measurement weight factors in accordance with embodiments of the current invention. Aspects of the present disclosure provide methods, apparatus, processing systems, and computer readable mediums for NR (new radio access technology, or 5G technology) or other radio access technology. NR may support various wireless communication services. These services may have different quality of service (QoS) requirements, latency requirements, connected density and reliability requirements. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. As an example, UE 101 or mobile station 101 is only in the service area of gNB 106 and connected with gNB 106. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively.

FIG. 1 further illustrates simplified block diagrams of a base station and a mobile device/UE that supports measurement weight factors. gNB 106 has an antenna 156, which transmits and receives radio signals. An RF transceiver circuit 153, coupled with the antenna 156, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations. These control modules can be implemented by circuits, software, firmware, or a combination of them.

In one novel aspect, measurement weight factors are configured for each inter-frequency measurement object (MO) within the measurement gap. The inter-frequency measurement object can be L3 measurement on an inter-frequency layer or L1 measurement on an inter-frequency layer or L1 measurement on an inter-frequency neighbor cell. L3 measurement includes L3-RSRP (Reference Signal based Reference Signal Received Power), and/or L3-RSRQ (Reference Signal based Reference Signal Received Quality), and/or L3-SINR (Reference Signal based Signal to Noise and Interference Ratio) measurement. L1 measurement includes L1-RSRP, and/or L1-SINR. In one embodiment, the base station (BS) configures different or same measurement weight factor for different measurement objects. BS can configure one or more than one measurement weight factor for the same MO and configure the conditions for the use each measurement weight factor. In another embodiment, the UE performs measurement based on the configured measurement objects and corresponding measurement weight factor. Suppose the configuration is: frequency layer $f_1$ with measurement weight factor $w_1$, frequency layer $f_2$ with measurement weight factor $w_2, \ldots,$ frequency layer $f_N$ with measurement weight factor $w_N$. The larger the measurement weight factor is, the more frequently the UE measures on the corresponding measurement object. In gap occasion $t_1$, frequency layers $f_1$, $f_2$, $f_4$, $f_5$ with corresponding measurement weight factors of $w_1$, $w_2$, $w_4$, and $w_5$, are to be measured. The measurement opportunity of the four frequencies are $w_1/(w_1+w_2+w_4+w_5)$, $w_2/(w_1+w_2+w_4+w_5)$, $w_4/(w_1+w_2+w_4+w_5)$, $w_5/(w_1+w_2+w_4+w_5)$. The scaling factor which scales the measurement delay requirements is the reverse number of the minimum measurement opportunity of the MO. According to some embodiments, the scaling factor is carrier-specific scaling factor.

FIG. 1 also includes simplified block diagrams of a UE, such as UE 101. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver 163 may comprise two RF modules (not shown) which are used for different frequency bands transmitting and receiving. RF transceiver 163 also converts received baseband signals from processor 162, converts them to RF signals, and sends out to antenna 165. Processor 162 processes the received baseband signals and invokes different functional modules to perform features in UE 101. Memory 161 stores program instructions and data 164 to control the operations of UE 101. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. A configuration receiver 191 receives one or more measurement configurations from a network entity in the wireless network, wherein the one or more measurement configurations configure a plurality of measurement objects (MOs) to be measured in one or more configured measurement gaps, and wherein each MO corresponding to a frequency layer or a cell on a frequency layer, and each frequency layer is associated with one or more MOs. A weight factor module 192 obtains a measurement weight factor for each MO, wherein a set of measurement weight factors is included in the one or more measurement configurations. A measurement module 193 performs interfrequency measurements within configured measurement gap occasions applying corresponding measurement weight factor for each MO. A measurement controller 194 obtains measurement opportunity for each frequency layer or MO based on the set of measurement weight factors. In one embodiment, Measurement controller 194 further obtains a scaling factor (SF) for a frequency layer or MO based on corresponding measurement opportunity for the frequency layer or MO in each gap occasion.

Figures 2, 3:
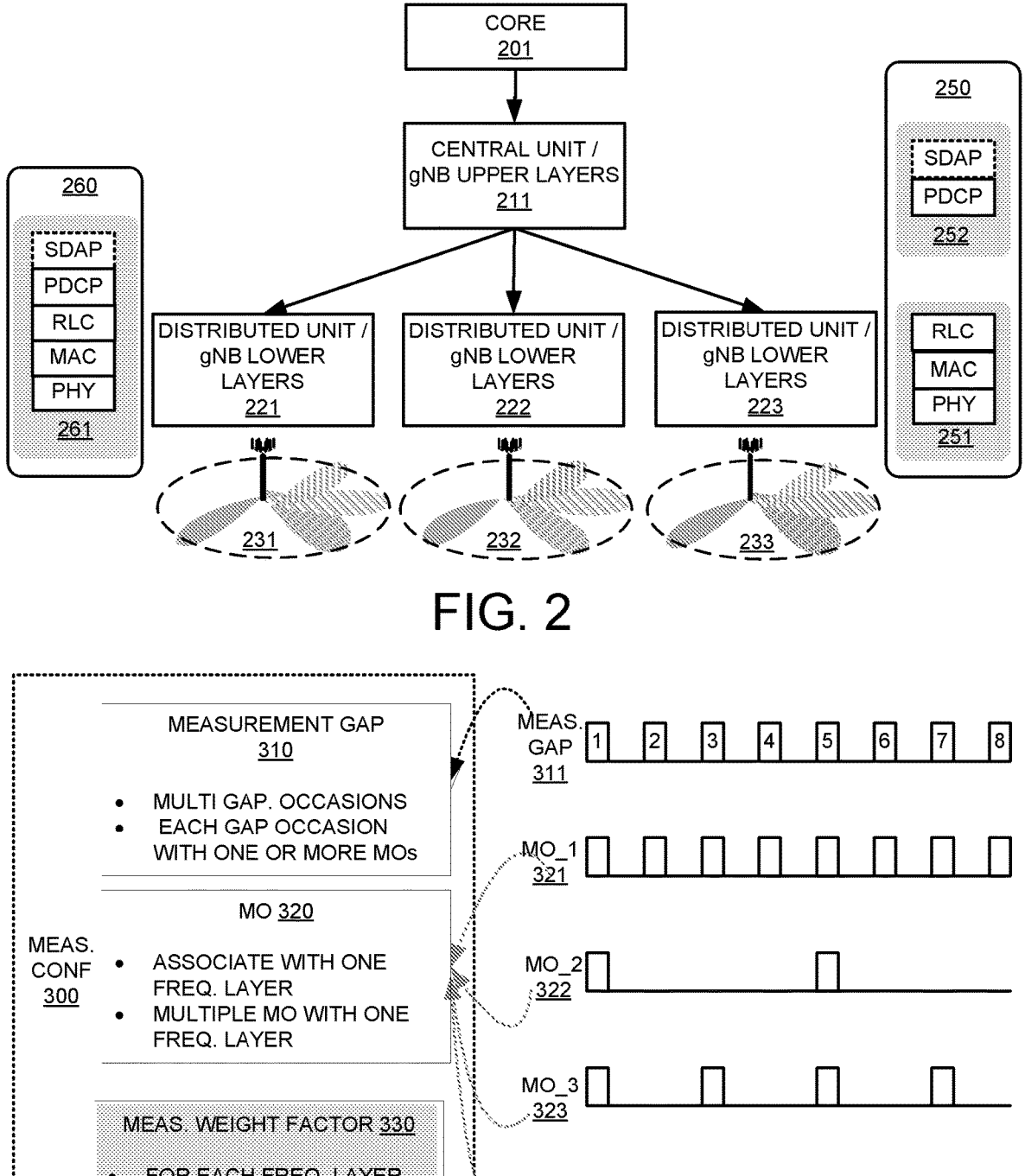
FIG. 2 illustrates an exemplary NR wireless system with centralized upper layers of the NR radio interface stacks.
FIG. 3 illustrates exemplary diagrams for measurement configurations with measurement weight factors in accordance with embodiment of the current invention.

FIG. 2 illustrates an exemplary NR wireless system with centralized upper layers of the NR radio interface stacks. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization, and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

FIG. 3 illustrates exemplary diagrams for measurement configurations with measurement weight factors in accordance with embodiment of the current invention. In one novel aspect, measurement weight factors are configured for inter-frequency measurements. Measurement configuration 300 includes measurement gap configuration 310, measurement object configuration 320 and measurement weight factor configuration 330. Each measurement gap configuration includes a certain measurement gap repetition period (MGRP) and offset. Through the measurement gap configuration, UE can derive when there are gap occasions. As illustrated in measurement gap 311, MGRP=20 ms, there are totally 8 gap occasions in 160 ms, such as gap occasion 1-8. One or more MOs may be associated with each configured gap. One or more MOs may be measured in each measurement occasion. For example, gap occasion-1 has MO_1, MO_2, and MO_3. Gap occasion-2 has MO_1 and MO_4. Measurement configuration also includes one or more measurement objects, such as MO_1 321, MO_2 322, MO_3 323, and MO_4 324. Each MO is associated with a frequency layer or a cell on a frequency layer. For example, MO_1 measurement is configured for L1 measurement on inter-frequency f1. MO_4 is configured for L1 measurement on cell 1 of inter-frequency f2. Each frequency layer may be associated with more than one MOs. For example, f1 configured with MO_1 on L1 measurement, and MO_3 is configured as L3 f1 measurement. In one novel aspect, a set of measurement weight factors 330 are configured. In one embodiment, the set of measurement weight factors are configured for each frequency layer. In another embodiment, the set of measurement weight factors are configured for each MO. In one embodiment, different measurement weight factors are configured for the same MO for different conditions.

Figure 4A:
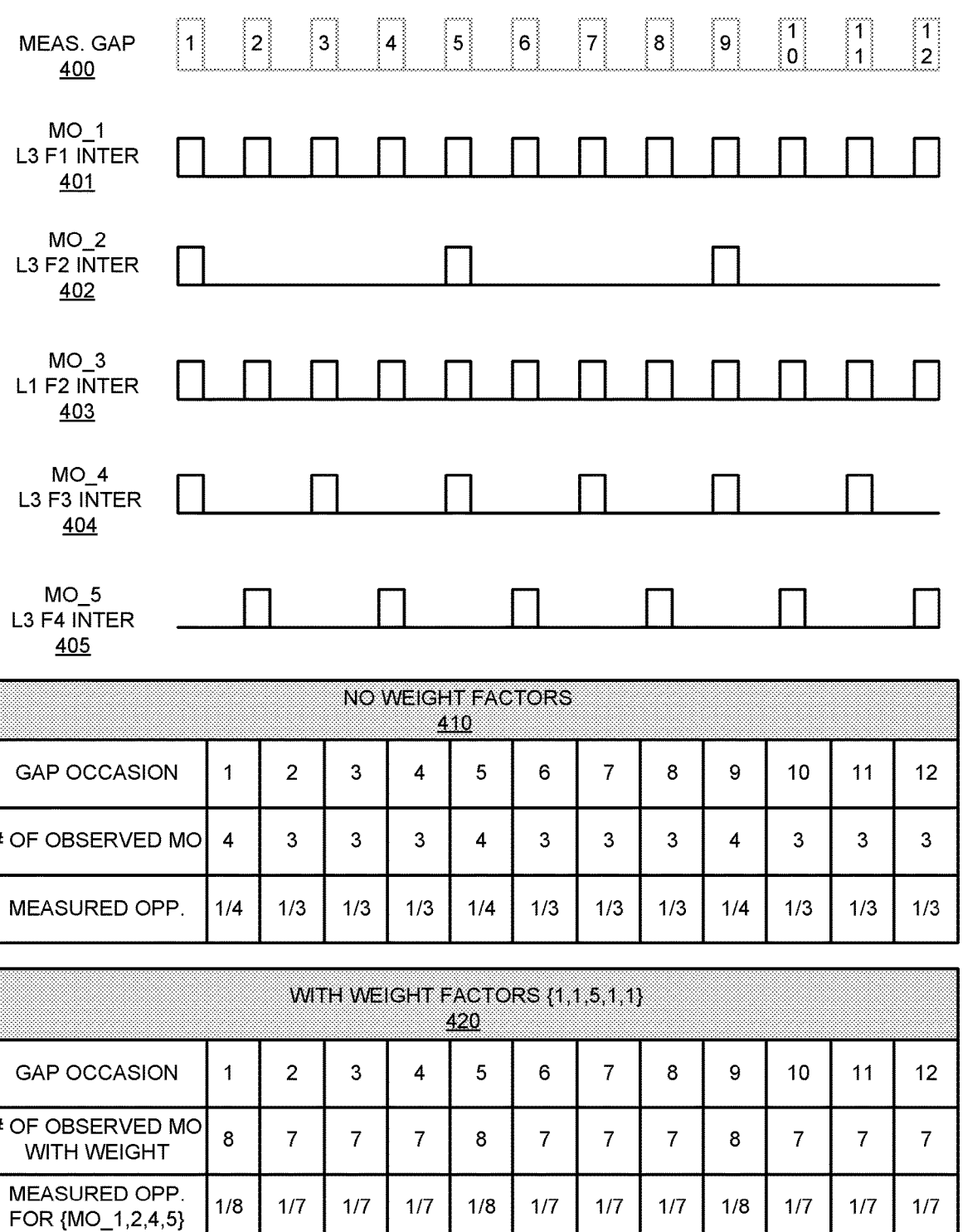
FIG. 4A illustrates exemplary diagrams for obtaining measurement opportunity for each MO based on measurement weight factors in accordance with embodiments of the current invention.

FIG. 4A illustrates exemplary diagrams for obtaining measurement opportunity for each MO based on measurement weight factors in accordance with embodiments of the current invention. Measurement gap 400 is configured with multiple gap occasions. Multiple measurement objects are configured. As an example, five inter-frequency MOs are configured to measure within gaps, including L3 measurement on f1~f4 and L1 measurement on f2. In particular, MO_1 401 is configured for inter-frequency L3 measurement on f1. MO_2 402 is configured for inter-frequency L3 measurement on f2. MO_3 403 is configured for inter-frequency L1 measurement on f2. MO_4 404 is configured for inter-frequency L3 measurement on f3. MO_5 405 is configured for inter-frequency L3 measurement on f4. In gap occasion #1, there are total of four inter-frequency MOs that can be measured, MO_1 401, MO_2 402, MO_3 403, and MO_4 404. In gap occasion #2, there are three interfrequency MOs that can be measured, MO_1 401, MO_3 403, and MO_5 405. In gap occasion #3, there are three inter-frequency MOs that can be measured, MO_1 401, MO_3 403, and MO_4 404. In gap occasion #4, there are three inter-frequency MOs that can be measured, MO_1 401, MO_3 403, and MO_5 405.

In a configuration 410 where no weight factors are configured, which equates to all measurement weight factors equal to one. The number of observed/possible MOs in gap occasion #1, #5, and #9 is four, in gap occasion #2-#4, #6-#8, and #10-#12 is three. Accordingly, the measurement opportunity for each MO in corresponding gap occasions are ¼ for gap occasion #1, #5, and #9, and ⅓ for gap occasion #2-#4, #6-#8, and #10-#12. The SF for each MO is derived based on the measurement opportunity. The SF is the reverse number of the minimum measurement opportunity of the MO. Accordingly, the SF for each MO in configuration 410 is as follows:

| MO Number | MO (Description) | SF |
|---|---|---|
| MO_1 | L3 f1 | 4 |
| MO_2 | L3 f2 | 4 |
| MO_3 | L1 f2 | 4 |
| MO_4 | L3 f3 | 4 |
| MO_5 | L3 f4 | 3 |

In one novel aspect, the network entity, such as the base station configures different measurement weight factors for different measurement objects. A UE can be configured with different kinds of measurement gap. Here the measurement weight factor applies for measurement in per-UE measurement gap, per-FR measurement gap, network controlled small gap but not limits to the above. Suppose the configuration is $f_1$ with $w_1$, $f_2$ with $w_2$, ..., $f_N$ with $w_N$, where $f_i$ is the frequency layer corresponding to one or more MOs, and $w_i$ is the measurement weight factor. $f_i$ and may be two frequency layers of the same frequency but related to different MOs. Here $w_i$ can be configured for each frequency layer or each MO. When $w_i$ is configured for each MO and $f_i$ corresponds to multiple MOs, choose the largest $w_i$. UE performs measurement based on the configured measurement objects and corresponding measurement weight factor. The larger the measurement weight factor is, the more frequently the UE measures on the corresponding measurement object. The measurement opportunity of each frequency layer in each gap occasion is calculated as follows: In gap occasion $t_1$, suppose $f_1$, $f_2$, $f_4$, $f_5$ are to be measured. The measurement opportunity of the four frequencies are $p_{1,t1}=w_1/(w_1+w_2+w_4+w_5)$, $p_{2,t1}=w_2/(w_1+w_2+w_4+w_5)$, $p_{4,t1}=w_4/(w_1+w_2+w_4+w_5)$, $p_{5,t1}=w_5/(w_1+w_2+w_4+w_5)$. SF is the maximum of $\{1/p_{i,t1}, 1/p_{i,t2}, 1/p_{i,t3}, \ldots, 1/p_{i,tK}\}$ for $f_i$ and K=number of gap occasions in 160 ms. SF is a factor that scales the measurement delay requirements.

In configuration 420, measurement weight factors are configured for each MO, with $\{1,1,5,1,1\}$ for MO_1 to MO_5, respectively. MO_1, MO_2, MO_4, and MO_5 are configured with measurement weight factor of '1', and MO_3 is configured with measurement weight factor of '5'. Applying the configured measurement weight factors, the number of observed/possible equivalent MOs in gap occasion #1, #5, and #9 is eight, in gap occasion #2-#4, #6-#8, and #10-#12 is seven. Accordingly, the measurement opportunity for MO_1, MO_2, MO_4 in gap occasion #1, #5, #9 is ⅛. The measurement opportunity for MO_3 in gap occasion #1, #5, and #9 is ⅝. The measurement opportunity for MO_1, MO_4 in gap occasion #3 and #11 is 1/7. The measurement opportunity for MO_1, MO_5 in gap occasion #2, #4, #6, #8, #10 and #12 is 1/7. The measurement opportunity for MO_3 in gap occasion #2-#4, #6-#8, and #10-#12 is 5/7. Please note that some Mos are not measured in some gap occasions. For instance, MO_2 and MO_4 are not measured in gap occasion #2. The SF for each MO is derived based on the measurement opportunity. The SF is the reverse number of the minimum measurement opportunity of the MO. Accordingly, the SF for each MO in configuration 420 is as follows.

| MO Number | MO (Description) | SF |
|---|---|---|
| MO_1 | L3 f1 | 8 |
| MO_2 | L3 f2 | 8 |
| MO_3 | L1 f2 | 8/5 |
| MO_4 | L3 f3 | 8 |
| MO_5 | L3 f4 | 7 |

Figure 4B:
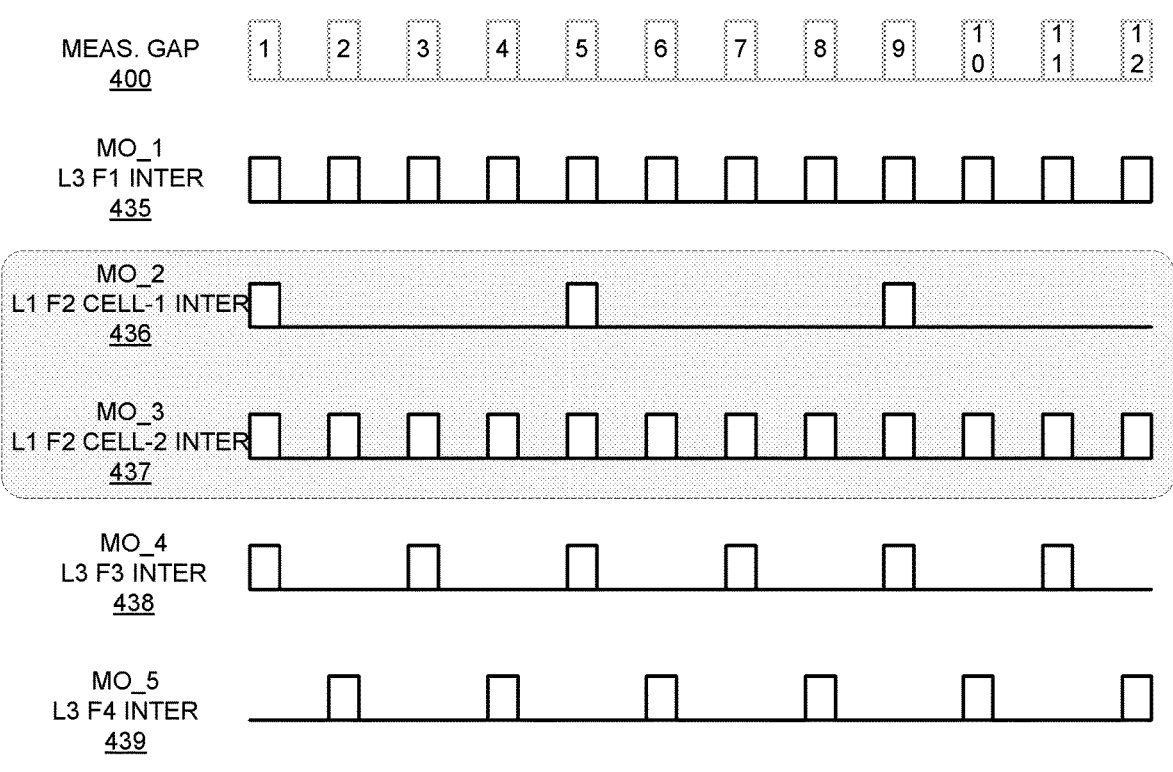
FIG. 4B illustrates exemplary diagrams for obtaining measurement opportunity for each MO based on measurement weight factors, when different measurement weights applied for different cells in accordance with embodiments of the current invention.

FIG. 4B illustrates exemplary diagrams for obtaining measurement opportunity for each MO based on measurement weight factors, when different measurement weights applied for different cells in accordance with embodiments of the current invention. In one embodiment, a MO is configured/corresponds to a frequency layer. In one embodiment, a MO is configured/corresponds to a cell of a frequency layer. For example, different MOs are configured for the same measurement on different cells. As an example, five inter-frequency MOs are configured to measure within gaps, including L3 measurement on f1~f4 and L1 measurement on f2. In particular, MO_1 435 is configured for inter-frequency L3 measurement on f1. MO_2 436 is configured for inter-frequency L1 measurement on f2 for cell #1. MO_3 437 is configured for inter-frequency L1 measurement on f2 for cell #2. MO_4 438 is configured for inter-frequency L3 measurement on f3. MO_5 439 is configured for inter-frequency L3 measurement on f4. For MO_2 436 and MO_3 437, both are L1 measurements on f2, while MO_2 436 is for cell #1 and MO_3 436 is for cell #2. Two different MOs are configured for the same measurement on different cells.

In one embodiment, different measurement weights apply to the same measurement for different cells, such as for cell #1 of MO_1 and cell #2 of MO_2.

In configuration 430, measurement weight factors are configured for each MO, with $\{1,1,5,1,1\}$ for MO_1 to MO_5, respectively. MO_1, MO_2, MO_4, and MO_5 are configured with measurement weight factor of '1', and MO_3 is configured with measurement weight factor of '5'. Applying the configured measurement weight factors, the number of observed/possible equivalent MOs in gap occasion #1, #5, and #9 is eight, in gap occasion #2-#4, #6-#8, and #10-#12 is seven. Accordingly, the measurement opportunity for MO_1, MO_2, MO_4 in gap occasion #1, #5, and #9 is ⅛. The measurement opportunity for MO_3 in gap occasion #1, #5, and #9 is ⅝. The measurement opportunity for MO_1, MO_4 in gap occasion #3 and #11 is 1/7. The measurement opportunity for MO_1, MO_5 in gap occasion #2, #4, #6, #8, #10 and #12 is 1/7. The measurement opportunity for MO_3 in gap occasion #2-#4, #6-#8, and #10-#12 is 5/7. Please note that some Mos are not measured in some gap occasions. For instance, MO_2 and MO_4 are not measured in gap occasion #2. The SF for each MO is derived based on the measurement opportunity. The SF is the reverse number of the minimum measurement opportunity of the MO. Accordingly, the SF for each MO in configuration 430 is as follows.

| MO Number | MO (Description) | SF |
|---|---|---|
| MO_1 | L3 f1 | 8 |
| MO_2 | L1 of cell 1 on f2 | 8 |
| MO_3 | L1 of cell 2 on f2 | 8/5 |
| MO_4 | L3 f3 | 8 |
| MO_5 | L3 f4 | 7 |

Figure 4C:
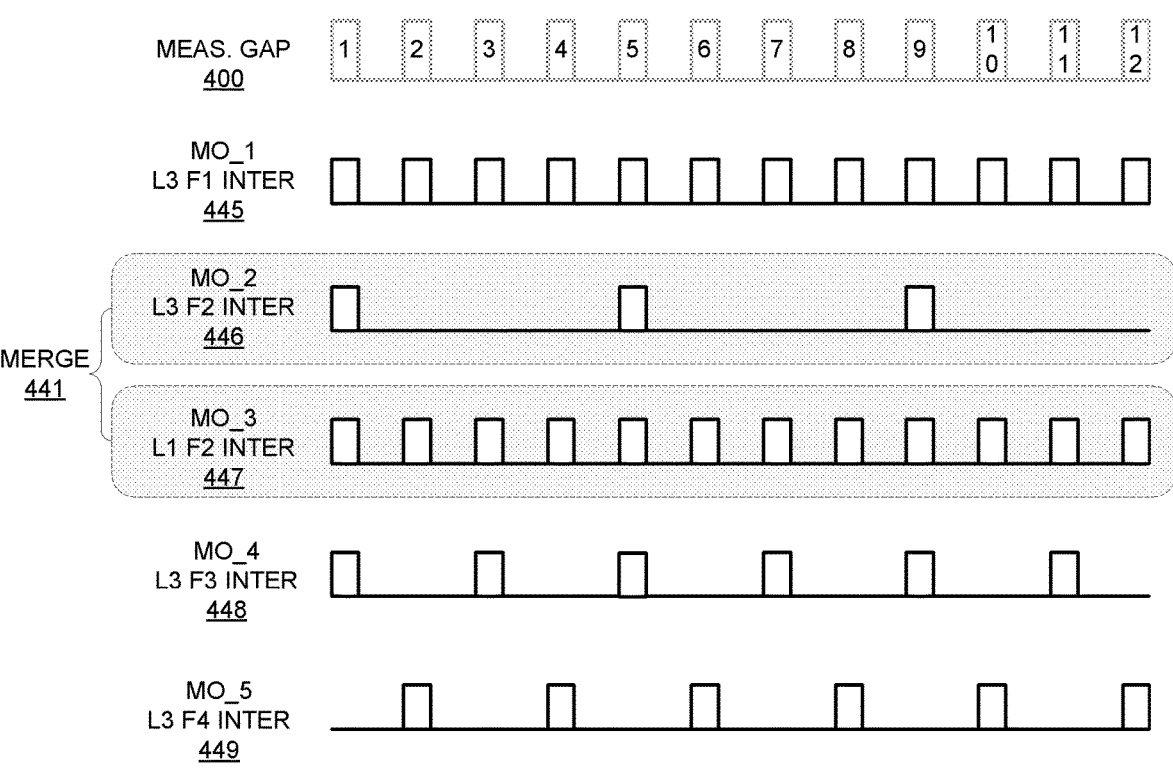
FIG. 4C illustrates exemplary diagrams for obtaining measurement opportunity for each MO based on measurement weight factors, when different MO for measurements on different layers merged in accordance with embodiments of the current invention

FIG. 4C illustrates exemplary diagrams for obtaining measurement opportunity for each MO based on measurement weight factors, when different MO for measurements on different layers merged in accordance with embodiments of the current invention. In some embodiments, one or more different MOs can be merged. As an example, five inter-frequency MOs are configured to measure within gaps, including L3 measurement on f1-f4 and L1 measurement on f2. In particular, MO_1 445 is configured for inter-frequency L3 measurement on f1. MO_2 446 is configured for inter-frequency L3 measurement on f2. MO_3 447 is configured for inter-frequency L1 measurement on f2. MO_4 448 is configured for inter-frequency L3 measurement on f3. MO_5 449 is configured for inter-frequency L3 measurement on f4. In configuration 440, measurement weight factors are configured for each MO, with $\{1,1,5,1,1\}$ for MO_1 to MO_5, respectively. MO_1, MO_2, MO_4, MO 5 and MO_5 are configured with measurement weight factor of '1', and MO_3 is configured with measurement weight factor of '5'. In one embodiment, measurements on the same frequency with different layers, such as L3 measurement for MO_2 446 and L1 measurement for MO_3 447, can be merged. In one embodiment, when one or more MOs merge, the highest weight factor applies to all the merged MOs. In another embodiment, the lowest weight factor applies to the one or more merged MOs. In yet another embodiment, a weight factor for the merged MOs is preconfigured or dynamically configured. In one embodiment, a weight factor is determined for the one or more merged MOs based on one or more predefined merging rules. As an example (441), MO_2 446 and MO_3 447 is merged. Weight factor '5' applies to both MO_2 446 and MO_3 447.

Applying the configured measurement weight factors, the number of observed/possible equivalent MOs in gap occasion #1, #5, and #9 is seven, in gap occasion #2-#4, #6-#8, and #10-#12 is also seven. Accordingly, the measurement opportunity for MO_1, MO_4 in gap occasion #1, #5, and #9 is ⅐. The measurement opportunity for MO_2, MO_3 in gap occasion #1, #5, and #9 is 5/7. The measurement opportunity for MO_1, MO_3 in gap occasion #3 and #11 is ⅐. The measurement opportunity for MO_1, MO_5 in gap occasion #2, #4, #6, #8, #10 and #12 is ⅐. The measurement opportunity for MO_3 in gap occasion #2-#4, #6-#8, and #10-#12 is 5/7. Please note that some Mos are not measured in some gap occasions. For instance, MO_2 and MO_4 are not measured in gap occasion #2. The SF for each MO is derived based on the measurement opportunity. The SF is the reverse number of the minimum measurement opportunity of the MO. Accordingly, the SF for each MO in configuration 440 is as follows.

| MO Number | MO (Description) | SF |
|-----------|------------------|-----|
| MO_1 | L3 f1 | 7 |
| MO_2 | L3 f2 | 7/5 |
| MO_3 | L1 f2 | 7/5 |
| MO_4 | L3 f3 | 7 |
| MO_5 | L3 f4 | 7 |

Figure 5:
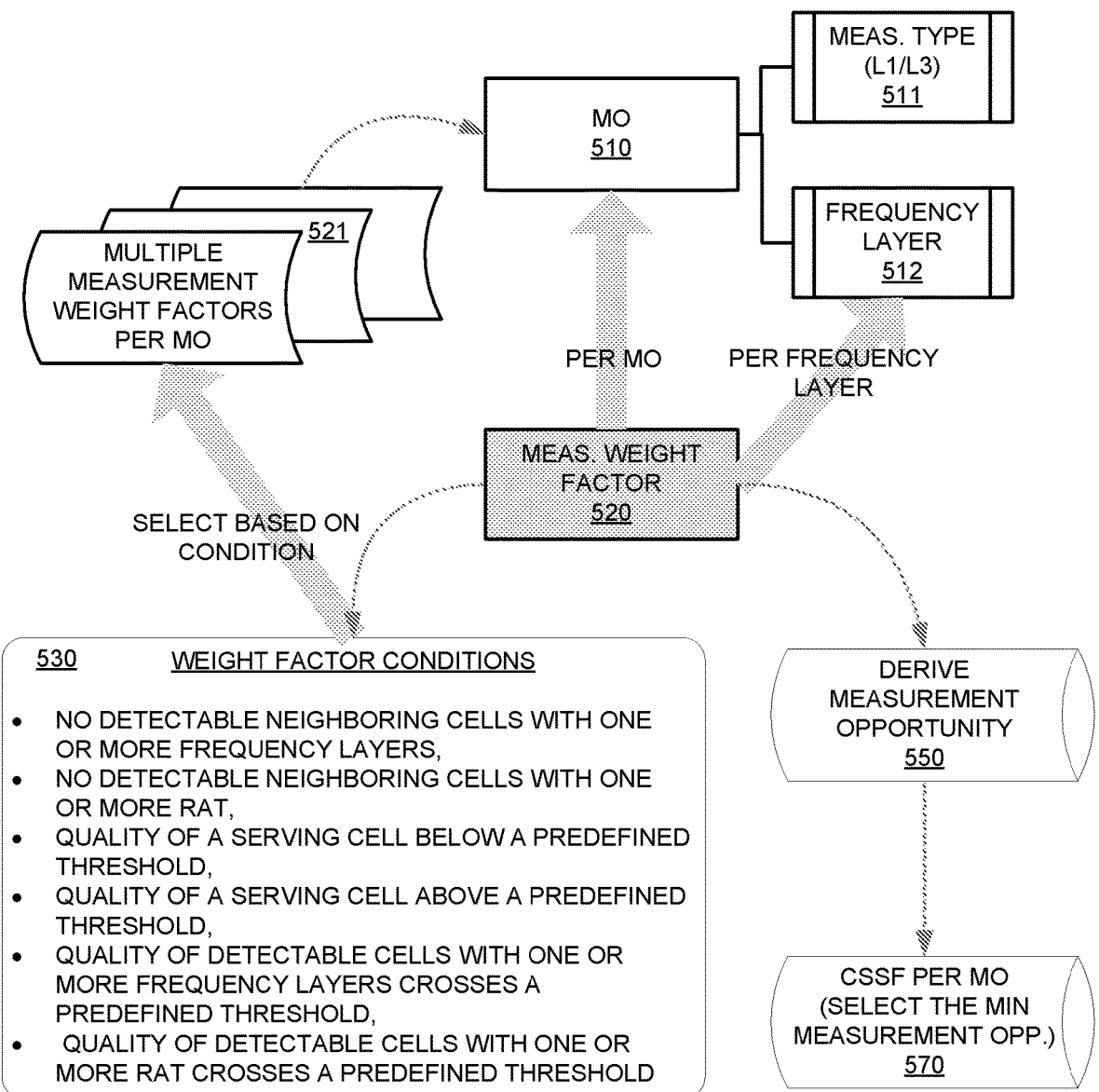
FIG. 5 illustrates an exemplary diagram for measurement weight factor configuration and measurement opportunity and SF determination in accordance with embodiments of the current inventions.

FIG. 5 illustrates an exemplary diagram for measurement weight factor configuration and measurement opportunity and SF determination in accordance with embodiments of the current inventions. In one novel aspect, measurement weight factor 520 is configured. A MO is associated with a frequency layer 512 and a measurement type 511, such as L1 measurement or a L3 measurement. Measurement weight factor 520 can be configured per MO, or per frequency layer. In one embodiment, the BS configures one or more than one weight factor 521 for the same MO, such as MO 510; and configures the conditions for the use of each weight factor. The conditions can be no detectable neighbor cells of some frequency or some RAT, or/and the quality of the serving cell or/and detectable cells of some frequency or some RAT or some MO below/above the threshold, where the thresholds can be different for different cells or frequencies or RATs or MOs. In one embodiment, the weight factor conditions 530 include no detectable neighboring cells with one or more frequency layers, no detectable neighboring cells with one or more radio access technologies (RATs), quality of a serving cell below a predefined threshold, quality of a serving cell above a predefined threshold, quality of detectable cells with one or more frequency layers crosses a predefined threshold, and quality of detectable cells with one or more RATs crosses a predefined threshold. For example, the weight factors for LTE MOs are configured as ⅓ and the condition is that the RSRP of at least one of the detected NR cells including the serving cell is above −100 dBm. When this condition is met, the weight factor ⅓ is used for LTE MOs, otherwise default factor 1 is used. In one embodiment 550, the UE obtains measurement opportunity for each frequency layer based on the set of measurement weight factors. In one embodiment 570, a scaling factor (SF) for a frequency layer is obtained based on corresponding measurement opportunity for the frequency layer in each gap occasion.

FIG. 6 illustrates an exemplary flow chart for a UE to apply the measurement weight factors in accordance with embodiments of the current invention. At step 601, the UE receives one or more measurement configurations from a network entity in a wireless network, wherein the one or more measurement configurations configure a plurality of measurement objects (MOs) to be measured in one or more configured measurement gaps, and wherein each MO corresponding to a frequency layer or a cell of a frequency layer, and each frequency layer is associated with one or more MOs. At step 602, the UE obtains a measurement weight factor for each MO, wherein a set of measurement weight factors is included in the one or more measurement gap configurations. At step 603, the UE performs inter-frequency measurements within configured measurement gap occasions applying corresponding measurement weight factor for each MO.

FIG. 7 illustrates an exemplary flow chart for a base station to configure the measurement weight factors in accordance with embodiments of the current invention. At step 701, the base station configures one or more measurement configurations for a user equipment (UE) in a wireless network, wherein the one or more measurement configurations configure a plurality of measurement objects (MOs) to be measured in one or more configured measurement gaps, and wherein each MO corresponding to a frequency layer or a cell of a frequency layer, and each frequency layer is associated with one or more MOs. At step 702, the base station configures a measurement weight factor for each MO, wherein a set of measurement weight factors is included in the one or more measurement configurations. At step 703, the base station transmits the one or more measurement configurations to the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

receiving, by a user equipment (UE), one or more measurement configurations from a network entity in a wireless network, wherein the one or more measurement configurations configure a plurality of measurement objects (MOs) to be measured in one or more configured measurement gaps, and wherein each MO corresponding to a frequency layer or a cell of a frequency layer, and each frequency layer is associated with one or more MOs, wherein a plurality of measurement weight factors are configured for a MO, and wherein each measurement weight factor for the same MO is determined based on one or more weight conditions, and wherein the one or more weight conditions comprising no detectable neighboring cells with one or more frequency layers, no detectable neighboring cells with one or more radio access technologies (RATs), quality of a serving cell below a predefined threshold, quality of a serving cell above a predefined threshold, quality of detectable cells with one or more frequency layers crosses a predefined threshold, and quality of detectable cells with one or more RATs crosses a predefined threshold;

obtaining a measurement weight factor for each MO, wherein a set of measurement weight factors is included in the one or more measurement configurations; and performing inter-frequency measurements within configured measurement gap occasions applying corresponding measurement weight factor for each MO.

2. The method of claim 1, wherein the set of measurement weight factors are configured for each frequency layer.

3. The method of claim 1, wherein the set of measurement weight factors are configured for each MO.

4. The method of claim 1, wherein each measurement gap has a gap type comprising a per-UE measurement gap, per-FR measurement gap, and a network controlled small gap.

5. The method of claim 1, further comprising: obtaining measurement opportunity for each frequency layer based on the set of measurement weight factors.

6. The method of claim 5, wherein a scaling factor (SF) for a frequency layer is obtained based on corresponding measurement opportunity for the frequency layer in each gap occasion.

7. The method of claim 1, further comprising: obtaining measurement opportunity for each measurement object based on the set of measurement weight factors.

8. The method of claim 7, wherein a scaling factor for each measurement object is obtained based on corresponding measurement opportunity for the measurement object in each gap occasion.

9. A method comprising:

configuring, by a base station, one or more measurement configurations for a user equipment (UE) in a wireless network, wherein the one or more measurement configurations configure a plurality of measurement objects (MOs) to be measured in one or more configured measurement gaps, and wherein each MO corresponding to a frequency layer or a cell of a frequency layer, and each frequency layer is associated with one or more MOs, wherein a plurality of measurement weight factors are configured for a MO, and wherein each measurement weight factor for the same MO is determined based on one or more weight conditions, and wherein the one or more weight conditions comprising no detectable neighboring cells with one or more frequency layers, no detectable neighboring cells with one or more radio access technologies (RATs), quality of a serving cell below a predefined threshold, quality of a serving cell above a predefined threshold, quality of detectable cells with one or more frequency layers crosses a predefined threshold, and quality of detectable cells with one or more RATs crosses a predefined threshold;

configuring a measurement weight factor for each MO, wherein a set of measurement weight factors is included in the one or more measurement configurations; and transmitting the one or more measurement configurations to the UE.

10. The method of claim 7, wherein the set of measurement weight factors are configured for each frequency layer.

11. The method of claim 7, wherein the set of measurement weight factors are configured for each MO.

12. The method of claim 7, wherein each measurement gap has a gap type comprising a per-UE measurement gap, per-FR measurement gap, and a network controlled small gap.

13. The method of claim 7, wherein a plurality of measurement weight factors are configured for a MO, and wherein each measurement weight factor for the same MO is determined based on one or more weight conditions.

14. A user equipment (UE), comprising:

a transceiver that transmits and receives radio frequency (RF) signal in a wireless network;

a configuration receiver that receives one or more measurement configurations from a network entity in the wireless network, wherein the one or more measurement configurations configure a plurality of measurement objects (MOs) to be measured in one or more configured measurement gaps, and wherein each MO corresponding to a frequency layer or a cell of a frequency layer, and each frequency layer is associated with one or more MOs, wherein a plurality of measurement weight factors are configured for a MO, and wherein each measurement weight factor for the same MO is determined based on one or more weight conditions, and wherein the one or more weight conditions comprising no detectable neighboring cells with one or more frequency layers, no detectable neighboring cells with one or more radio access technologies (RATs), quality of a serving cell below a predefined threshold, quality of a serving cell above a predefined threshold, quality of detectable cells with one or more frequency layers crosses a predefined threshold, and quality of detectable cells with one or more RATs crosses a predefined threshold;

a weight factor module that obtains a measurement weight factor for each MO, wherein a set of measurement weight factors is included in the one or more measurement configurations; and a measurement module that performs inter-frequency measurements within configured measurement gap occasions applying corresponding measurement weight factor for each MO.

15. The UE of claim 14, wherein the set of measurement weight factors are configured for each frequency layer.

16. The UE of claim 14, wherein the set of measurement weight factors are configured for each MO.

17. The UE of claim 14, wherein each measurement gap has a gap type comprising a per-UE measurement gap, per-FR measurement gap, and a network controlled small gap.

18. The UE of claim 14, wherein a plurality of measurement weight factors are configured for a MO, and wherein each measurement weight factor for the same MO is determined based on one or more weight conditions.

19. The UE of claim 14, further comprising a measurement controller that obtains measurement opportunity for each frequency layer based on the set of measurement weight factors.

20. The UE of claim 18, wherein the measurement controller further obtains a scaling factor (SF) for a frequency layer based on corresponding measurement opportunity for the frequency layer in each gap occasion.

\* \* \* \* \*